United States Patent
Alkouh (10) Patent No.: US 10,147,218 B2
(45) Date of Patent: Dec. 4, 2018

(54) SYSTEM TO IDENTIFY AND USE MARKERS FOR MOTION CAPTURE

(71) Applicant: SONY INTERACTIVE ENTERTAINMENT AMERICA, LLC, San Mateo, CA (US)

(72) Inventor: Homoud B. Alkouh, San Diego, CA (US)

(73) Assignee: Sony Interactive Entertainment America, LLC, San Mateo, CA (US)

(*) Notice: Subject to any disclaimer, the term of this patent is extended or adjusted under 35 U.S.C. 154(b) by 57 days.

(21) Appl. No.: 15/280,883

(22) Filed: Sep. 29, 2016

(65) Prior Publication Data

US 2018/0089876 A1    Mar. 29, 2018

(51) Int. Cl.
- *G06T 7/20* (2017.01)
- *G06T 13/40* (2011.01)
- *G06T 7/00* (2017.01)

(52) U.S. Cl.
CPC ............ *G06T 13/40* (2013.01); *G06T 7/0042* (2013.01); *G06T 7/20* (2013.01); *G06T 2207/10016* (2013.01); *G06T 2207/30196* (2013.01); *G06T 2207/30204* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,556,196 B1* | 4/2003 | Blanz | G06K 9/00275 345/419 |
| 6,661,470 B1* | 12/2003 | Kawakami | G09G 3/2022 345/474 |
| 7,428,318 B1* | 9/2008 | Madsen | G06T 7/136 348/154 |
| 9,072,929 B1* | 7/2015 | Rush | G09B 19/003 |
| 9,584,653 B1* | 2/2017 | Lyren | H04M 1/72583 |
| 2003/0063292 A1* | 4/2003 | Mostafavi | A61B 6/463 356/614 |
| 2004/0081335 A1* | 4/2004 | Kondo | H04N 5/272 382/107 |
| 2004/0179013 A1* | 9/2004 | Menache | G06T 11/00 345/473 |
| 2006/0008116 A1* | 1/2006 | Kiraly | G06T 7/20 382/103 |
| 2006/0126928 A1* | 6/2006 | Edwards | G06K 9/00281 382/154 |

(Continued)

*Primary Examiner* — Martin Mushambo
(74) *Attorney, Agent, or Firm* — Seed IP Law Group LLP (57) ABSTRACT

Methods and systems that enhance motion capture capabilities. In one such method, the motion capture system enables a user to set parameters, based on hue, lightness, and saturation, for example, to assist in identifying and searching for motion capture markers that are applied to real-life subjects. In another implementation, the motion capture system enables a user to determine a distance between a master marker and a slave marker, and to use that distance to establish bounding boxes for searching for the slave marker in subsequent frames. Further, in some implementations, the motion capture system further uses the distance when rendering an animated scene based on the motion capture session to estimate the position of the slave marker when the slave marker is not visible in a captured frame.

10 Claims, 5 Drawing Sheets

(56) References Cited

U.S. PATENT DOCUMENTS

| | | | |
|---|---|---|---|
| 2006/0157640 A1* | 7/2006 | Perlman | H04N 5/2254 250/208.1 |
| 2006/0192857 A1* | 8/2006 | Kondo | G06T 7/20 348/208.4 |
| 2007/0052711 A1* | 3/2007 | Gordon | G06F 3/011 345/473 |
| 2007/0127817 A1* | 6/2007 | Yokoi | G06K 9/00771 382/181 |
| 2007/0146370 A1* | 6/2007 | Gordon | G06T 7/246 345/474 |
| 2008/0056610 A1* | 3/2008 | Kanda | G02B 21/365 382/282 |
| 2008/0166022 A1* | 7/2008 | Hildreth | G06F 3/017 382/107 |
| 2008/0180436 A1* | 7/2008 | Kraver | G06K 9/00228 345/420 |
| 2009/0109240 A1* | 4/2009 | Englert | G06T 19/006 345/633 |
| 2009/0122058 A1* | 5/2009 | Tschesnok | G06T 7/564 345/420 |
| 2009/0160767 A1* | 6/2009 | Sugaya | G06F 3/0304 345/157 |
| 2009/0220155 A1* | 9/2009 | Yamamoto | G06K 9/00221 382/190 |
| 2010/0027839 A1* | 2/2010 | Sikka | G06K 9/00335 382/103 |
| 2010/0208205 A1* | 8/2010 | Tseng | A61B 3/113 351/209 |
| 2010/0208991 A1* | 8/2010 | Kimata | G06T 5/50 382/167 |
| 2011/0135149 A1* | 6/2011 | Gefen | G01S 3/7864 382/103 |
| 2011/0206273 A1* | 8/2011 | Plagemann | G06K 9/00342 382/154 |
| 2013/0038521 A1* | 2/2013 | Sugaya | G06F 3/0304 345/156 |
| 2013/0051697 A1* | 2/2013 | Takahashi | G06T 5/002 382/265 |
| 2013/0057728 A1* | 3/2013 | Ushijima | G03B 13/36 348/231.99 |
| 2013/0308001 A1* | 11/2013 | Jelinek | H04N 5/23254 348/208.1 |
| 2014/0140596 A1* | 5/2014 | Kawaguchi | G06K 9/00348 382/128 |
| 2015/0003687 A1* | 1/2015 | Utsunomiya | G06T 7/2046 382/107 |
| 2015/0206004 A1* | 7/2015 | Liang | G06K 9/6212 382/103 |
| 2015/0294481 A1* | 10/2015 | Sakaue | G06Q 50/22 382/103 |
| 2016/0353026 A1* | 12/2016 | Blonde | G06T 7/0002 |
| 2017/0177939 A1* | 6/2017 | Beall | G06K 9/00671 |

* cited by examiner

SYSTEM TO IDENTIFY AND USE MARKERS FOR MOTION CAPTURE

TECHNICAL FIELD

The present disclosure generally relates to providing improved motion capture techniques. More particularly, but not exclusively, the present disclosure relates to improved techniques for identifying markers.

BACKGROUND

Description of the Related Art

Motion capture systems allow developers to capture the motion of a real-life subject, such as an actor, by tracking markers that are attached or painted onto the subject's body. The various positions of the markers are captured over time as the subject moves during a motion capture session. The system uses the movement from the real-life subject, as captured through the markers, as the basis for moving a virtual subject in two-dimensional or three-dimensional space. This technique allows designers and animators to associate more realistic movements and expressions to the virtual subject than is generally possible through traditional animation techniques. Motion capture also allows for faster development time because at least some of the rendering of the virtual subject can be automated based on the motion captured from the real-life subject, whereas traditional animation may require an animator to render an animated subject for each frame.

Motion capture systems, though, cannot always track each marker throughout a motion capture session. For example, some of the markers may become hidden from the camera as the subject moves or rotates throughout the session. This issue may be especially prevalent during motion capture for two-dimensional space, which uses only one camera to capture the movement of the markers. When a marker becomes occluded from the view of the camera for one or more frames, the motion capture system may discontinue tracking that marker for those frames. Accordingly, the occluded marker in these situations does not provide any information to the motion capture system for creating the virtual subject in the two- or three-dimensional space. As a result, the rendering of the virtual subject may suffer from visual artifacts as the motion capture system attempts to render the subject across multiple frames. For example, jitter issues can arise as a result of the motion capture system losing track of and missing data from the occluded marker across multiple frames. In addition, the processing resources required of the system increase as the system attempts to render and animate the virtual image using fewer markers.

BRIEF SUMMARY

Briefly, and in general terms, there is disclosed systems and methods for enhancing motion capture capabilities. More particularly, there is disclosed improved techniques for identifying markers. Still further, there is disclosed a method where the motion capture system enables a user to set parameters, based on hue, lightness, and saturation, for example, to assist in identifying and searching for motion capture markers that are applied to real-life subjects. In another implementation, the motion capture system enables a user to determine a distance between a master marker and a slave marker, and to use that distance to establish bounding boxes for searching for the slave marker in subsequent frames. Further, in some implementations, the motion capture system further uses the distance when rendering an animated scene based on the motion capture session to estimate the position of the slave marker when the slave marker is not visible in a captured frame.

Continuing, there is disclosed a method for identifying a marker used in a motion capture session that may be summarized as including the obtaining of coordinates corresponding to a location of a target pixel within the marker as rendered on a display; selecting a set of pixels, the set of pixels including the target pixel and pixels surrounding the target pixel; analyzing the target pixel and the surrounding pixels in the set of pixels to determine display characteristics of the pixels; and using the display characteristics of the pixels to identify the marker in additional frames captured during the motion capture session. The pixels surrounding the target pixel may be identified based on a predetermined radius extending out from the target pixel. The predetermined radius may be set relative to an expected size of the marker shown on the display. The display characteristics may include at least one value selected from the group consisting of a hue value, a saturation value, a lightness value, and any combination thereof.

In another implementation, a method for identifying a marker used in a motion capture session may be summarized as including identifying in a first frame of the motion capture session a master marker; identifying in the first frame a slave marker, the slave marker separated from the master marker by a distance; using the distance to create a bounding box in subsequent frames of the motion capture session; and searching within the bounding box for the slave marker in the subsequent frames of the motion capture session. The distance between the master marker and the slave marker may be determined by calculating the number of pixels separating the master marker and the slave marker.

Still further, the method may include obtaining coordinates corresponding to a location of a target pixel within the slave marker as rendered in the first frame; selecting a set of pixels, the set of pixels including the target pixel and pixels surrounding the target pixel; analyzing the target pixel and the surrounding pixels in the set of pixels to determine display characteristics of the pixels; and using the display characteristics of the pixels to identify the slave marker in additional frames captured during the motion capture session.

In another implementation, a method of rendering an animated subject based upon the movements of a real-life subject wearing one or more physical markers during a motion capture session may be summarized as including identifying a physical master marker; identifying a physical slave marker, the physical slave marker separated from the physical master marker by a distance; calculating the distance between the physical master marker and the physical slave marker; associating a virtual slave marker with the physical slave marker, the virtual slave marker being separated from the physical master marker by the distance; and rendering the animated subject, to maintain the distance between the physical master marker and the virtual slave marker; and using positional information about the virtual slave marker to render the animated subject when positional information from the physical slave marker is not available. The positional information calculated for the virtual slave marker may differ from the positional information for the physical slave marker during at least a portion of the rendering of the animated subject.

In another implementation, there is disclosed a system to identify a marker used in a motion capture session that may be summarized as including a memory device in communication with a processor, the memory device having instructions stored thereon that, in response to execution by the processor, cause the processor to: obtain coordinates corresponding to a location of a target pixel within the marker as rendered on a display; select a set of pixels, the set of pixels including the target pixel and pixels surrounding the target pixel; analyze the target pixel and the surrounding pixels in the set of pixels to determine display characteristics of the pixels; and use the display characteristics of the pixels to identify the marker in additional frames captured during the motion capture session. The pixels surrounding the target pixel may be identified based on a predetermined radius extending out from the target pixel. The predetermined radius may be set relative to an expected size of the marker shown on the display. The display characteristics may include at least one value selected from the group consisting of a hue value, a saturation value, a lightness value, and any combination thereof.

Continuing, in another implementation, a system to identify a marker used in a motion capture session may be summarized as including a memory device in communication with a processor, the memory device having instructions stored thereon that, in response to execution by the processor, cause the processor to: identify in a first frame of the motion capture session a master marker; identify in the first frame a slave marker, the slave marker separated from the master marker by a distance; use the distance to create a bounding box in subsequent frames of the motion capture session; and search within the bounding box for the slave marker in the subsequent frames of the motion capture session. The distance between the master marker and the slave marker may be determined by calculating the number of pixels separating the master marker and the slave marker.

The instructions stored on the memory device, in response to execution by the processor, may further cause the processor to: obtain coordinates corresponding to a location of a target pixel within the slave marker as rendered in the first frame; select a set of pixels, the set of pixels including the target pixel and pixels surrounding the target pixel; analyze the target pixel and the surrounding pixels in the set of pixels to determine display characteristics of the pixels; and use the display characteristics of the pixels to identify the slave marker in additional frames captured during the motion capture session.

In another implementation, a system to render an animated subject based upon movements of a real-life subject wearing one or more physical markers during a motion capture session may be summarized as including a memory device in communication with a processor, the memory device having instructions stored thereon that, in response to execution by the processor, cause the processor to: identify a physical master marker; identify a physical slave marker, the physical slave marker separated from the physical master marker by a distance; calculate the distance between the physical master marker and the physical slave marker; associate a virtual slave marker with the physical slave marker, the virtual slave marker being separated from the master marker by the distance; and rendering the animated subject to maintain the distance between the master marker and the virtual slave marker; and use positional information about the virtual slave marker to render the animated subject when positional information from the physical slave marker is not available. The positional information calculated for the virtual slave marker may differ from the positional information for the physical slave marker during at least a portion of the rendering of the animated subject.

Other features and aspects of the disclosed technology will become apparent from the following detailed description, taken in conjunction with the accompanying drawings, which illustrate by way of example, the features of the various embodiments.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Persons of ordinary skill in the art will understand that the present disclosure is illustrative only and not in any way limiting. Other embodiments of the presently disclosed system and method readily suggest themselves to such skilled persons having the assistance of this disclosure. In the following description, certain specific details are set forth in order to provide a thorough understanding of various disclosed embodiments or implementations. However, one skilled in the relevant art will recognize that embodiments or implementations may be practiced without one or more of these specific details, or with other methods, components, materials, etc. In other instances, well-known structures associated with the various embodiments or implementations have not been shown or described in detail to avoid unnecessarily obscuring descriptions of the embodiments or implementations.

Each of the features and teachings disclosed herein can be utilized separately or in conjunction with other features and teachings to provide a motion capture environment in which motions from real-life subjects are captured for use in creating and rendering animated subjects. Although the technology disclosed herein relates primarily to motion capture, it will be appreciated that the technology and techniques can be applied to any system that tracks motion, such as for example, facial recognition technology, video game development, animation, and virtual reality. Representative examples utilizing many of these additional features and teachings, both separately and in combination, are described in further detail with reference to attached FIGS. 1-5. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Unless the context requires otherwise, throughout the specification and claims that follow, the word "comprising" is synonymous with "including," and is inclusive or open-ended (i.e., does not exclude additional, unrecited elements or method acts). The term "herein" refers to the specification, claims, and drawings associated with the current application. As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise. The term "based on" is not exclusive and allows for being based on additional features, functions, aspects, or limitations not described, unless the context clearly dictates otherwise.

Reference throughout this specification to "one embodiment," "an embodiment," "one implementation," or "an implementation" means that a particular feature, structure or characteristic described in connection with the embodiment or implementation is included in at least one embodiment or implementation. Thus, the appearances of the phrases "in one embodiment," "in an embodiment," "one implementation," or "an implementation" in various places throughout this specification are not necessarily all referring to the same embodiment or implementation. Furthermore, the particular features, structures, or characteristics may be combined in any suitable manner in one or more embodiments or implementations.

The headings and Abstract of the Disclosure provided herein are for convenience only and do not interpret the scope or meaning of the embodiments or implementations.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages and a variety of motion capture environments may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Systems and methods for enhancing motion capture capabilities are described below. In one such method, the motion capture system enables a user to set parameters to assist in searching for motion capture markers that are applied to real-life subjects. For example, the motion capture system can obtain hue, lightness, and saturation measurements of one or more markers to obtain a maximum and a minimum value for each of these measurements for the selected markers. In subsequent frames, the motion capture system uses the maximum and minimum hue, lightness, and saturation values determined for each marker to search for the same marker in other frames. By using this technique as disclosed herein, the motion capture system can more quickly and efficiently identify the markers when processing a motion capture session.

In another implementation, the motion capture system enables a user to associate markers as master and slave markers. The motion capture system then determines and sets a distance between the master and slave markers. The distance may be based on the two-dimensional distance between the master marker and the slave marker as captured during the first frame of a motion capture session. The motion capture system then uses the determined distance between the master marker and the slave marker throughout the motion capture session. For example, the motion capture system can use the distance calculation to create a bounding box when searching for the slave marker in later frames. Thus, instead of searching the entire frame for the marker, the motion capture system can search the relatively smaller bounding box, thus reducing the processing demands placed on the motion capture system.

In some implementations, the motion capture system uses the distance when rendering an animated scene based on the motion capture session to estimate the position of the slave marker when the slave marker is not visible in a captured frame. Estimating the position based on the previously determined distance of the slave marker from the master marker enables the motion capture system to provide a smoother representation, with little or no jitter, of the virtual subject as rendered in two-dimensional or three-dimensional space.

Figure 1:
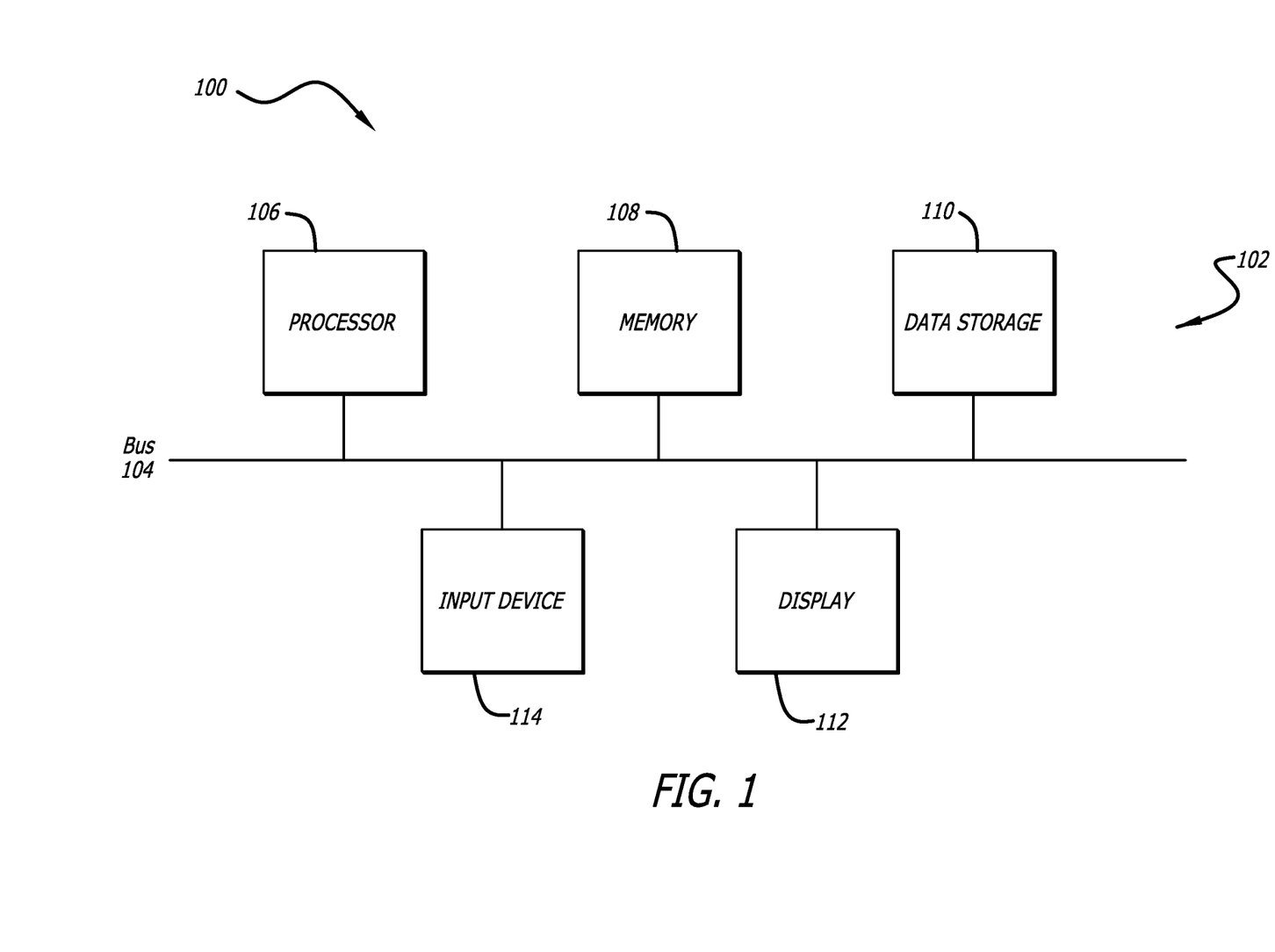
FIG. 1 is a block diagram of a motion capture system that captures and processes motion using markers positioned on a real-life subject.

Referring to FIG. 1, a motion capture system 100 generally includes a computer system 102 for capturing and processing motion from markers placed on a real-life subject according to the techniques described herein, and for rendering a virtual subject based on the captured and processed motions of the real-life subject. The computer system 102 includes a bus 104 connecting a processor 106, a memory 108, data storage 110, a display 112 and an input device 114. Generally, this relates to a conventional von Neumann architecture; however, one skilled in the art will appreciate that the techniques described herein are equally applicable to other computer architectures, such as, for example, computer systems having separate data and instruction buses. The computer system 102 includes instructions stored in data storage 110, or on any other computer-readable medium. When executed, these instructions configure the computer system 102 to enable the processor 106 to identify and track one or more markers placed onto or drawn on the surface of a real-life subject and capture motion from the one or more markers. The instructions may further configure the computer system 102 to enable the processor 106 to create and render animated subjects based on the captured motion from the markers, and to store data related to the motion from the one or more markers in memory 108. The processor 106 displays the resulting animated subjects stored in memory 108 by rendering the animated subjects to be viewed using the display 112. In one implementation, data related to the markers and to the animated subjects are entered using an input device 114, including, but not limited to a video camera, a mouse, a keyboard, and/or some combination thereof. More particularly, the input device 114 may be embodied as one or more of the following: a keyboard, a mouse, a trackball, a track pad, a gyroscopic point device, a digital video camera, and the like.

The processor 106 includes any device, such as, for example, those processors commonly used in personal computers, laptops, and/or mobile devices, capable of executing instructions to capture movement from markers placed on real-life subjects and to process the captured movement to create and render animated subjects. Furthermore, the processor 106 may include multiple cores for simultaneous and parallel execution.

Figure 2A:
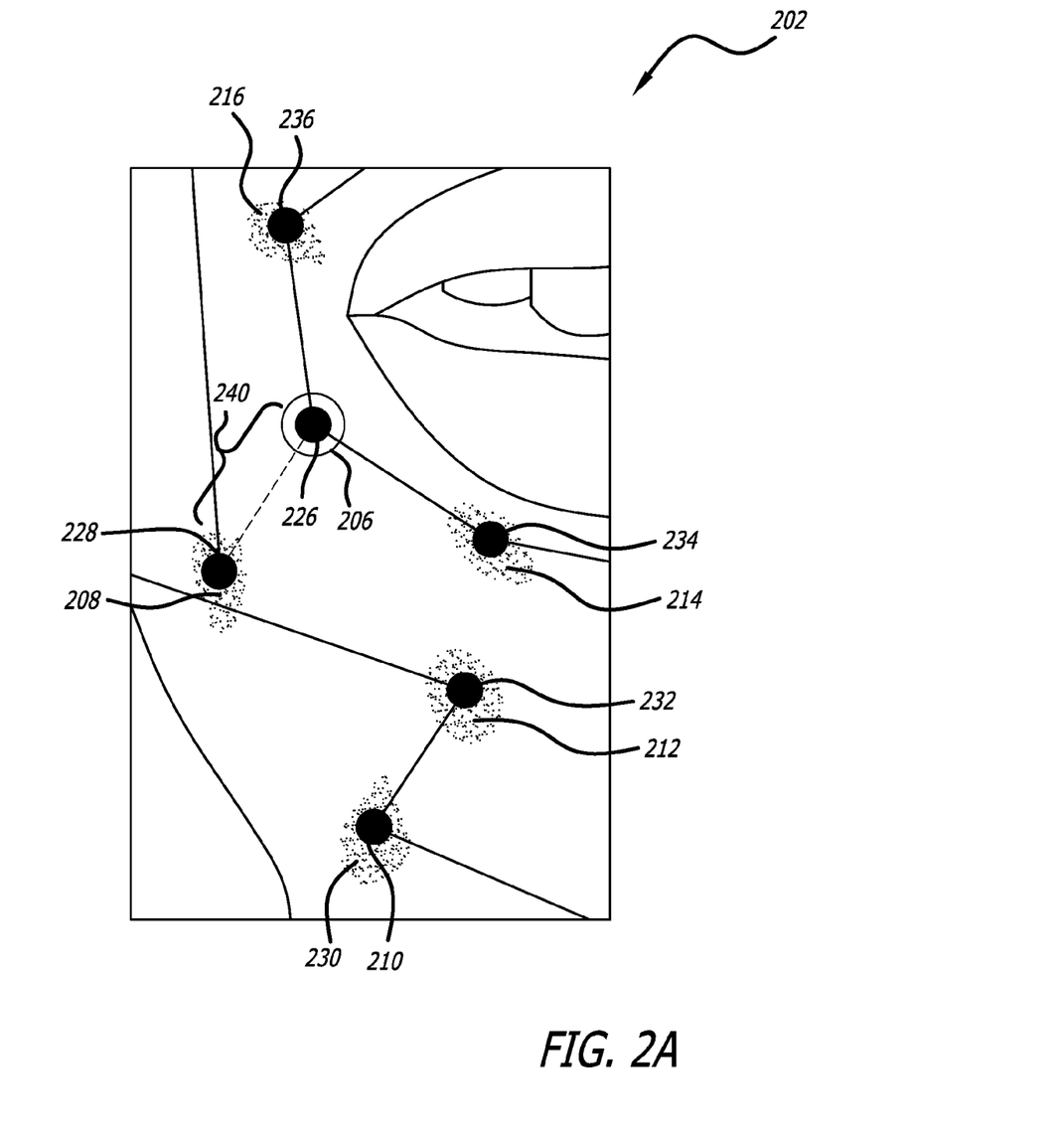
FIG. 2A is an illustration of an output display that shows a first frame of a motion capture session involving a close-up of the face of a real-life model as recorded and processed by the motion capture system, in accordance with one illustrated embodiment.

FIG. 2A illustrates an output display 202 that shows a first frame of a motion capture session involving a close-up of the face 204 of a real-life model as recorded and processed by the motion capture system 100, in accordance with one illustrated embodiment. As shown in FIG. 2A, the face 204 has been marked with physical markers 206, 208, 210, 212, 214, and 216. The physical markers may be any device or marking that the motion capture system 100 can identify when processing the motion capture session. In some implementations, the physical marker is a reflective object that is attached to the surface or skin of the real-life subject. Alternatively, the markers may consist of paint or any other substance that when applied to the surface or skin of the real-life subject provides a high contrast to the surrounding surface or skin color of the real-life subject, enabling improved detection of the marker by the motion capture system 100.

In some implementations, the motion capture system 100 analyzes the captured images of the markers to improve the speed and efficiency at which the motion capture system 100 processes the motion capture session of the real-life subject. Accordingly, in some implementations, the motion capture system 100 enables a user to select one or more markers 206, 208, 210, 212, 214, and 216 for analysis before processing the motion capture session. The analysis includes determining the maximum and minimum values for each of the hue, the lightness, and the saturation associated with the pixels used to display each of the selected markers. The motion capture system 100 obtains the hue, the saturation, and the lightness using the HLS color coordinate system. Alternatively, or in addition, the motion capture system 100 obtains maximum and minimum values and measurements from other color coordinate systems, such as the HSB (hue, saturation, and brightness) coordinate system or the HSI (hue, saturation, and intensity) coordinate system. In some implementations, the motion capture system 100 obtains the appropriate values, e.g., hue, lightness, and saturation, by converting from an RGB (red-green-blue) color scheme or CMYB (cyan-magenta-yellow-black) color scheme.

In some implementations, the user employs an input device 114, such as a mouse, to identify each marker, such as marker 206, to be analyzed. Thus, for example, the user identifies the marker 206 by clicking on the center of the marker 206 with a mouse. Once the user selects the marker 206, the motion capture system 100 identifies a target pixel associated with the user's selection and analyzes a set of pixels to determine the maximum and minimum values for the hue, lightness, and saturation for the pixels within that set. In some implementations, the set of analyzed pixels consists of the target pixel as well as pixels within a pre-defined radius of the target pixel. Further, the pre-defined radius is set so that the area of analyzed pixels will be less than the expected area, in terms of pixels, of the display of the marker to be analyzed. For example, if the motion capture system 100 analyzes markers that, when displayed, are about 10 pixels across, then the radius value is set be equal to or less than five (5) pixels. Accordingly, in such implementations, the motion capture system 100 analyzes only pixels that are used to render the marker, and does not analyze pixels that render the surrounding surface or skin of the real-life subject.

In some implementations, the motion capture system 100 associates the identified maximum and minimum hue, lightness, and saturation levels with the marker selected by the user, and uses these levels to set boundaries for identifying the same marker in other frames from the motion capture session. Because the lighting reflected from a marker varies during the motion capture session, the motion capture system 100 must account for the variations in appearance of the marker throughout the session. By identifying and setting maximum and minimum bounds for the hue, lightness, and saturation, or any other corresponding measurements used by the display 112 to render the motion capture session, the motion capture system 100 can more quickly and efficiently identify the markers associated with the real-life subject to process the motion capture session.

In some implementations, the motion capture system 100 establishes relationships between markers to improve the speed and efficiency at which the motion capture system 100 processes the motion capture session of the real-life subject. Accordingly, as shown in FIG. 2A, the motion capture system 100 has associated virtual markers 226, 228, 230, 232, 234, and 236 that correspond with each of the physical markers 206, 208, 210, 212, 214, and 216, respectively. Moreover, the motion capture system 100 associates virtual marker 226 with virtual marker 228 in which virtual marker 226 is a master ("master virtual marker 226") and virtual marker 228 is a slave ("slave virtual marker 228"). The motion capture system 100 also measures a distance 240 between master virtual marker 226 and slave virtual marker 228. In some implementations, the distance is measured in two dimensions according to the Pythagorean Theorem based on the pixels separating the two markers. Thus, if the master virtual marker 226 is located at pixel location ($x_p$, $y_p$) and the slave virtual marker 228 is located at pixel location ($x_c$, $y_c$), then the distance 240 (d) in terms of pixels is provided by the following equation:

$$d = \sqrt{(x_p - x_c)^2 + (y_p - y_c)^2} \quad \text{Eq. 1}$$

In some implementations, the distance 240 is calculated without taking the square root. The motion capture system 100 uses the calculated distance 240 when processing the motion capture session.

Figure 2B:
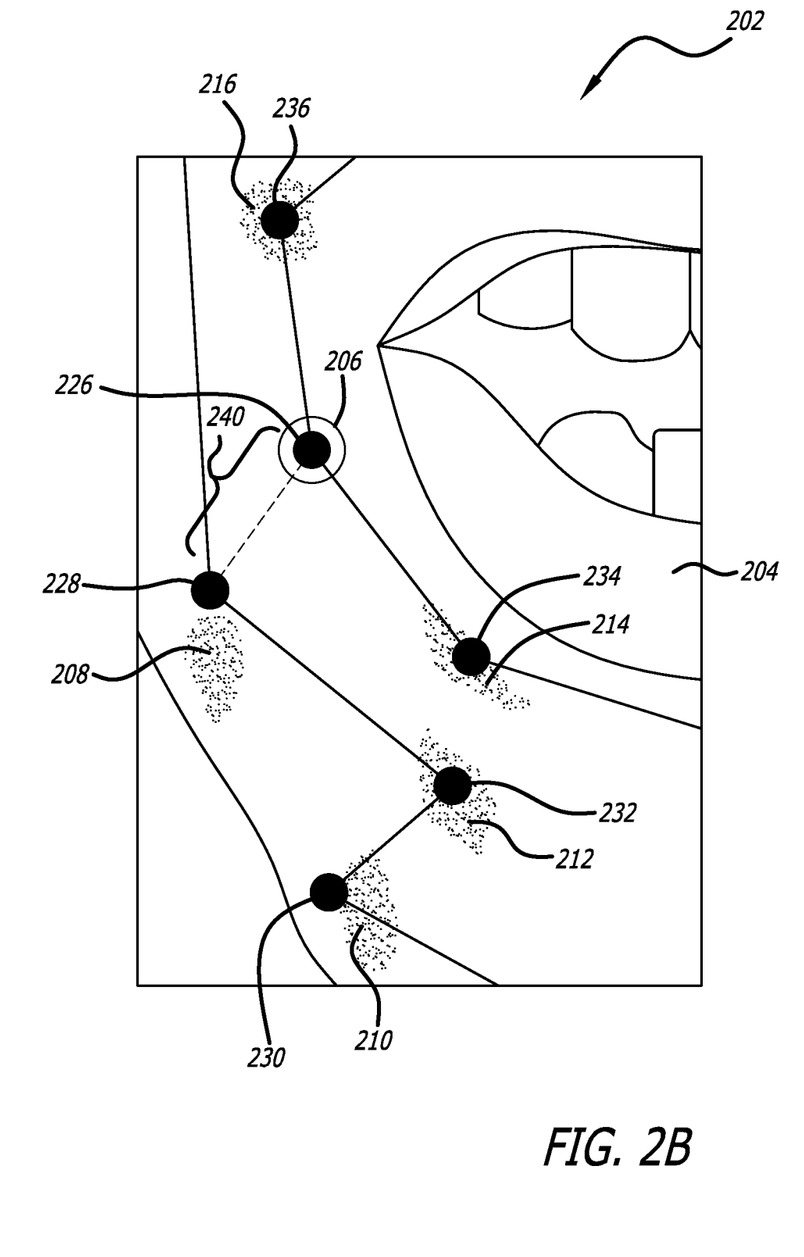
FIG. 2B is an illustration of an output display that shows a subsequent frame of the motion capture session as shown in FIG. 2A as recorded and processed by the motion capture system, in accordance with one illustrated embodiment.

FIG. 2B illustrates the output display 202 that shows a subsequent frame of the motion capture session as shown in FIG. 2A as recorded and processed by a motion capture system 100, in accordance with one illustrated embodiment. As shown in FIG. 2B, the position of the face 204 of the real-life subject has been altered, and the positions of physical markers 206, 208, 210, 212, 214, and 216 have changed between FIG. 2A and FIG. 2B. In addition, the motion capture system 100 has modified the locations of virtual markers 226, 230, 232, 234, and 236 to remain approximately in the center of the depictions of physical markers 206, 210, 212, 214, and 216, respectively. Nevertheless, the motion capture system 100 has maintained the distance 240 between master virtual marker 226 and slave virtual marker 228. Thus, as shown in FIG. 2B, slave virtual marker 228 is now located above the depiction of the corresponding physical marker 208. The motion capture system 100 maintains the distance 240 between master virtual marker 226 and slave virtual marker 228 throughout each frame of the motion capture session. Accordingly, the motion capture system 100 can easily calculate the position of the slave virtual marker 228 using the current location of the master virtual marker 226 and the distance 240.

The motion capture system 100 uses the distance 240 to process the motion capture session more quickly and efficiently. For example, the motion capture system 100 can set a bounding box 250 around an area of the display in which it will search for the depiction of the physical marker 208. Accordingly, instead of searching the entire screen for the depiction of the physical marker 208, the motion capture system 100 will search the more limited area of bounding box 250, as determined according to the location of virtual slave marker 228, to find the depiction of the corresponding physical marker 208. Limiting the search areas by using bounding boxes, such as bounding box 250, allows the motion capture session to identify marker locations more quickly and efficiently, thereby improving the efficiency and speed of the motion capture system 100 in processing the motion capture session.

The motion capture system 100 may also use the measurement of distance 240 to improve the predictability and accuracy of the virtual marker for the animated sequence that is based on the motion capture session. In particular, in at least some of the frames, the physical marker 208, which corresponds to the virtual slave marker 228, may be blocked from the camera's view. Accordingly, the motion capture system 100 is prevented in these frames from using the positional data for the occluded physical marker 208 when rendering the virtual subject. In this situation, however, the motion capture system 100 can use the distance measurement 240 to determine the position of the virtual slave marker 228. Accordingly, the motion capture system 100 can use the positional data calculated for virtual slave marker 228 when rendering and animating the virtual subject when the associated physical marker 208 has not been captured. By using the calculated positional data for the slave marker 228, the motion capture system 100 avoids the shortcomings of prior art systems in which the lack of data regarding an occluded marker could lead to jitter and other visual artifacts when rending a virtual subject based on a motion capture sequence.

Figure 3:
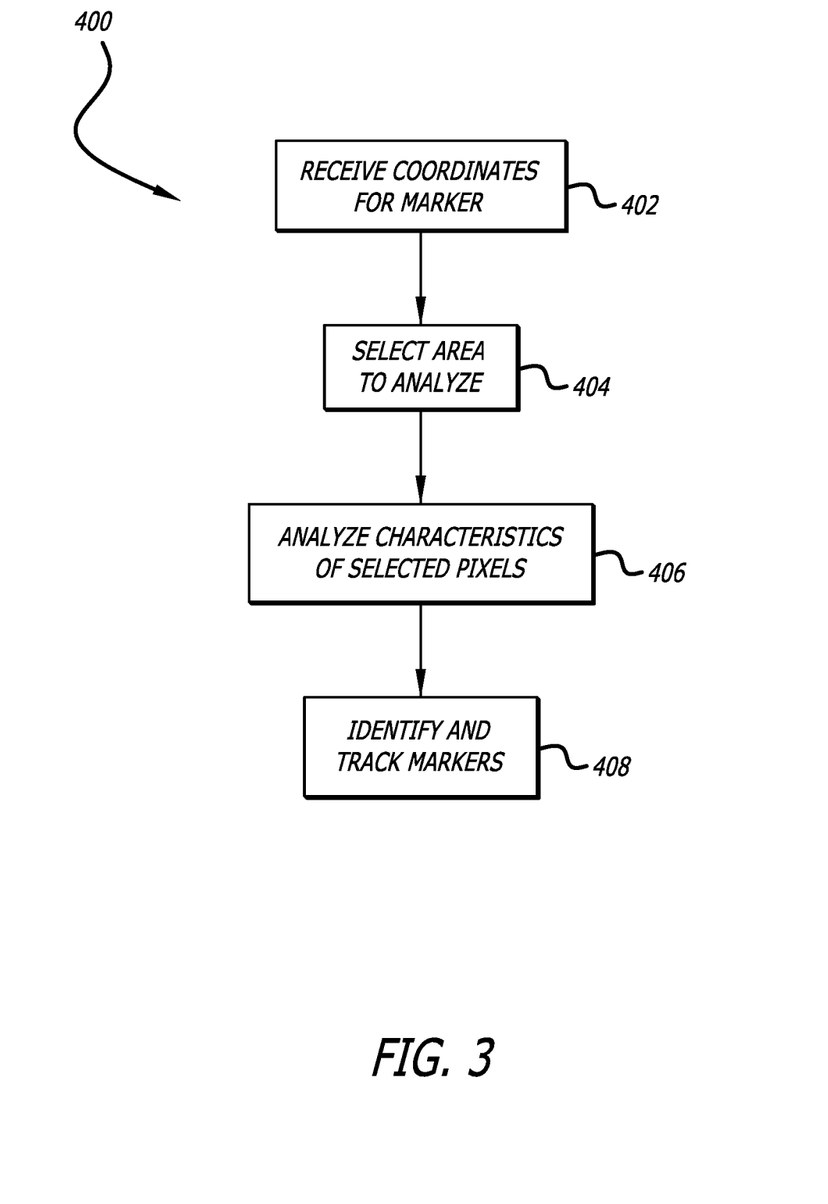
FIG. 3 is a logic flow diagram showing an example method for identifying markers recorded during a motion capture session, in accordance with one illustrated embodiment.

FIG. 3 is a logic flow diagram showing an example method 400 for identifying markers recorded during a motion capture session. In 402, a motion capture system 100 receives coordinates for a marker being displayed on an output display 112. In some implementations, the coordinates are pixel coordinates corresponding to one or more pixels used to render at least a portion of the marker on the output display 112. In some implementations, the coordinates are received from a user who has selected the marker using an input device 114. For example, the input device 114 may be a mouse that the user positions over a portion of a marker corresponding to a desired pixel and selecting the marker by clicking the mouse.

In 404, the motion capture system 100 selects an area of the selected marker to analyze. In some implementations, the motion capture system 100 selects a set of pixels that surround the pixel that was identified by the user in 402. For example, the selected set of pixels includes the identified pixel plus pixels extending out from the identified pixel by a defined radius of pixels. The radius of pixels can be defined based on the expected size of the display of the markers to be selected. In situations in which the marker is expected to be at least 10 pixels wide, then the radius that defines the set of pixels to be selected in 904 can be set to be five (5) or fewer pixels. Of course, a radius of any appropriate size may be used.

In 406, the motion capture system 100 analyzes various characteristics of the pixels selected in 404. For example, in 406, the hue, lightness, and saturation of the selected pixels may be performed. In addition, the motion capture system 100 may determine the minimum and maximum values for the hue, lightness, and saturation for the set of pixels selected in 404. The motion capture system 100 stores these minimum and maximum values in the memory 108.

In 408, the motion capture system 100 uses the hue, saturation, and lightness values determined in 406 to identify and track the marker in subsequent frames. The method ends at 408.

Figure 4:
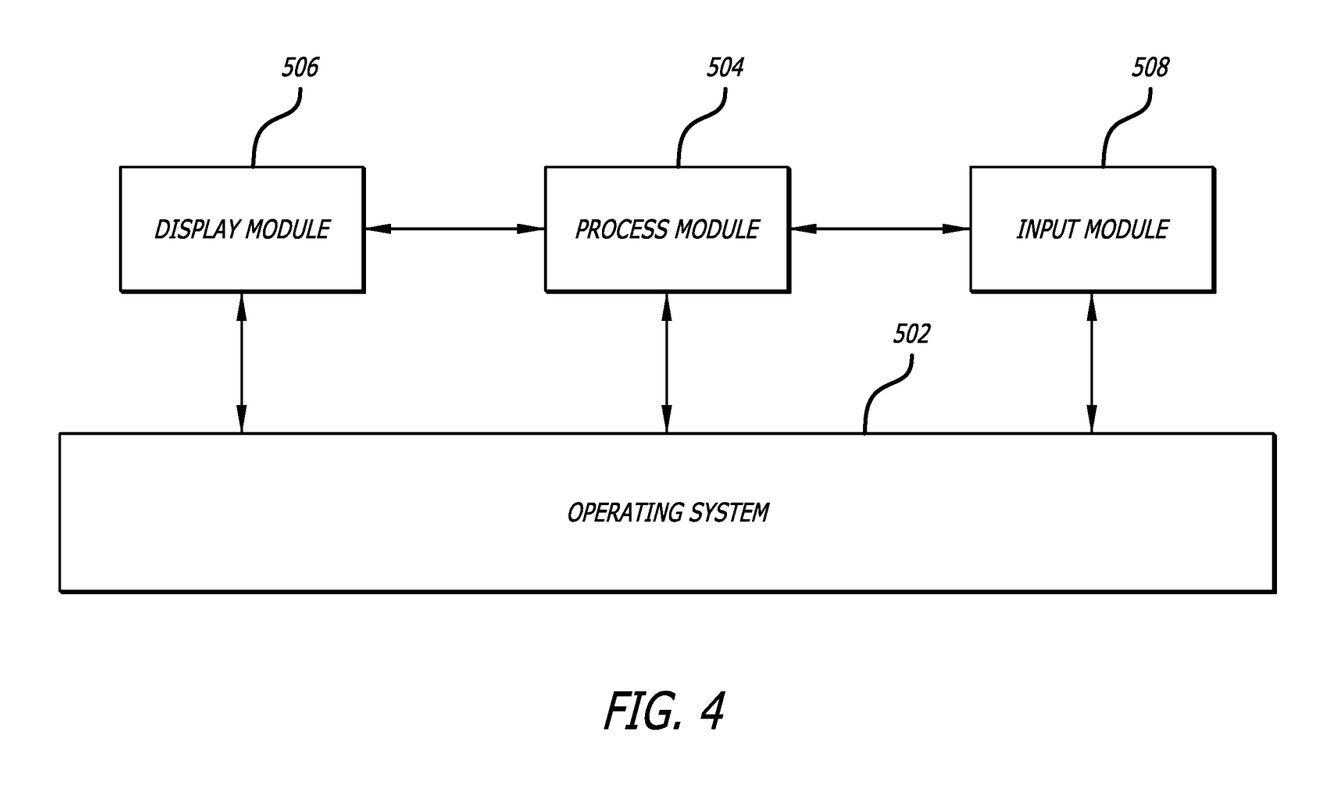
FIG. 4 is a block diagram of a system for capturing and processing data from a motion capture session, in accordance with one illustrated embodiment.

FIG. 4 is a block diagram of a system for capturing and processing data from a motion capture session, in accordance with one illustrated embodiment. Software for identifying markers and using those markers to render animated or virtual subjects includes an operating system 502 providing an environment for a process module 504 to interact with various components and peripherals of the system. The process module 504, the input module 506, and the display module 508 each interact with the operating system 502 and each other so as to determine the positional information for various markers and to render animated or virtual subjects based on the positional information. For example, the process module 504 implements a graphical user interface. User input, such as the video images of the motion capture session or settings related to processing the motion capture session, is received by the operating system 502 and processed by the process module 504. For example, when a user moves a mouse, the operating system 502 processes the movement and displays a pointer on the display. When a user clicks a button on the mouse, or other input device so as to indicate a selection, the input module 506 receives and processes the input, and the process module 504 updates data structures appropriately.

Data associated with real-life models and virtual models are stored on a computer-readable medium, such as, for example, random-access memory, a hard drive, flash memory, or the like. The memory can be located either locally or remotely to the system. Data associated with the various models may be stored in data structures that may be generated by process logic in the course of determining the different regions of the base shape or determining the modified positional information for each vertex.

The techniques and methods for identifying and using markers by a motion capture system described herein provide technical improvements to enhance motion capture capabilities. Such technical improvements allow a motion capture system to more quickly and efficiently identify markers that have been captured during a motion capture session. These improvements include (i) creating constraints in terms of color characteristics (e.g., hue, lightness, and/or saturation) of the marker to be used in subsequent searches for the marker, and (ii) measuring the distance in a first frame between a master marker and a slave marker that can be used to create a bounding box in subsequent frames in which to search for the slave marker. In addition, the technical improvements improve the efficiency and results of a motion capture system in rendering animated or virtual subjects based on the movements captured from the markers attached to real-life subjects during a motion capture session. For example, using the distance measurement determined above enables the motion capture system to compensate for markers that become occluded from the camera's view during the motion capture session. Instead of losing data from slave markers that are occluded, the motion capture system uses the distance measurement determined above to create virtual slave markers that it can then use in processing the animated or virtual subject. In some implementations, any combination of the above processes may be used to track and process markers within a motion capture system. In this way, the quality of the displayed product is enhanced and the processing demands on the system are diminished.

The techniques and methods for identifying and using markers can be used in other technology and situations in which markers are tracked in order to render a two-dimensional or a three-dimensional subject. For example, these techniques and methods may be used for video game rendering, 3-D rendering and animation, and augmented reality rendering and animation.

The technologies and methods disclosed in the above specification enable a motion capture system to process a motion capture session and render a related animation. These technologies and methods, for example, improve the speed and efficiency at which the motion capture system identifies markers placed on real life subjects. In addition, the disclosed technology may enable a motion capture system to track and use, during the rendering process, at least some of physical markers that have become hidden from the camera. In some embodiments, the distance may be based on a distance between a master marker and a slave marker. The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various implementations described above can be combined to provide further implementations. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, if any, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

These and other changes can be made to the embodiments in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for identifying a marker used in a motion capture session, the method comprising:
   identifying in a first frame of the motion capture session a master marker;

identifying in the first frame a slave marker, the slave marker separated from the master marker by a distance;

using the distance to create a bounding box in subsequent frames of the motion capture session; and searching within the bounding box for the slave marker in the subsequent frames of the motion capture session.

2. The method of claim 1, wherein the distance between the master marker and the slave marker is determined by calculating the number of pixels separating the master marker and the slave marker.

3. The method of claim 1, further comprising:

obtaining coordinates corresponding to a location of a target pixel within the slave marker as rendered in the first frame;

selecting a set of pixels, the set of pixels including the target pixel and pixels surrounding the target pixel;

analyzing the target pixel and the surrounding pixels in the set of pixels to determine display characteristics of the pixels; and using the display characteristics of the pixels to identify the slave marker in additional frames captured during the motion capture session.

4. A method of rendering an animated subject based upon movements of a real-life subject wearing one or more physical markers during a motion capture session, the method comprising:

identifying a physical master marker;

identifying a physical slave marker, the physical slave marker separated from the physical master marker by a distance;

calculating the distance between the physical master marker and the physical slave marker;

associating a virtual slave marker with the physical slave marker, the virtual slave marker being separated from the physical master marker by the distance; and rendering the animated subject, to maintain the distance between the physical master marker and the virtual slave marker; and using positional information about the virtual slave marker to render the animated subject when positional information from the physical slave marker is not available.

5. The method of claim 4, wherein the positional information calculated for the virtual slave marker differs from the positional information for the physical slave marker during at least a portion of the rendering of the animated subject.

6. A system to identify a marker used in a motion capture session, the system comprising:

a memory device in communication with a processor, the memory device having instructions stored thereon that, in response to execution by the processor, cause the processor to:

identify in a first frame of the motion capture session a master marker;

identify in the first frame a slave marker, the slave marker separated from the master marker by a distance;

use the distance to create a bounding box in subsequent frames of the motion capture session; and search within the bounding box for the slave marker in the subsequent frames of the motion capture session.

7. The system of claim 6, wherein the distance between the master marker and the slave marker is determined by calculating the number of pixels separating the master marker and the slave marker.

8. The system of claim 7, wherein the instructions stored on the memory device, in response to execution by the processor, further cause the processor to:

obtain coordinates corresponding to a location of a target pixel within the slave marker as rendered in the first frame;

select a set of pixels, the set of pixels including the target pixel and pixels surrounding the target pixel;

analyze the target pixel and the surrounding pixels in the set of pixels to determine display characteristics of the pixels; and use the display characteristics of the pixels to identify the slave marker in additional frames captured during the motion capture session.

9. A system to render an animated subject based upon movements of a real-life subject wearing one or more physical markers during a motion capture session, the system comprising:

a memory device in communication with a processor, the memory device having instructions stored thereon that, in response to execution by the processor, cause the processor to:

identify a physical master marker;

identify a physical slave marker, the physical slave marker separated from the physical master marker by a distance;

calculate the distance between the physical master marker and the physical slave marker;

associate a virtual slave marker with the physical slave marker, the virtual slave marker being separated from the master marker by the distance; and rendering the animated subject to maintain the distance between the master marker and the virtual slave marker; and use positional information about the virtual slave marker to render the animated subject when positional information from the physical slave marker is not available.

10. The system of claim 9, wherein the positional information calculated for the virtual slave marker differs from the positional information for the physical slave marker during at least a portion of the rendering of the animated subject.

* * * * *